United States Patent
Blumenthal et al.

(10) Patent No.: US 9,377,217 B2
(45) Date of Patent: Jun. 28, 2016

(54) SOLAR CONCENTRATING SYSTEMS

(71) Applicant: HELIOFOCUS, LTD., Ness Ziona (IL)

(72) Inventors: Yanir Blumenthal, Kfar Saba (IL); Thomas Keck, Grossbettlingen (DE); Wolfgang Schiel, Stuttgart (DE); Hristo Zlatanov, Stuttgart (DE)

(73) Assignee: HELIOFOCUS LTD, Ness Ziona (IL)

( * ) Notice: Subject to any disclaimer, the term of this patent is extended or adjusted under 35 U.S.C. 154(b) by 198 days.

(21) Appl. No.: 14/373,376

(22) PCT Filed: Jan. 21, 2013

(86) PCT No.: PCT/IL2013/000008
§ 371 (c)(1),
(2) Date: Jul. 21, 2014

(87) PCT Pub. No.: WO2013/108245
PCT Pub. Date: Jul. 25, 2013

(65) Prior Publication Data
US 2014/0352686 A1  Dec. 4, 2014

Related U.S. Application Data

(60) Provisional application No. 61/589,352, filed on Jan. 22, 2012.

(51) Int. Cl.
*G02B 7/183* (2006.01)
*F24J 2/10* (2006.01)
(Continued)

(52) U.S. Cl.
CPC .... *F24J 2/38* (2013.01); *F24J 2/10* (2013.01); *F24J 2/12* (2013.01); *F24J 2/46* (2013.01);
(Continued)

(58) Field of Classification Search
CPC ................... F24J 2/10; F24J 2/38; F24J 2/46; F24J 2/52; Y02E 10/47; G02B 7/183

USPC .......... 359/851, 853, 900; 126/600, 601, 604, 126/684, 688, 696, 714; 353/3
See application file for complete search history.

(56) References Cited

U.S. PATENT DOCUMENTS

| 811,274 | A | * | 1/1906 | Carter | F24J 2/07 |
| | | | | | 126/651 |
| 2,182,222 | A | * | 12/1939 | Courtis | F24J 2/07 |
| | | | | | 126/607 |

(Continued)

FOREIGN PATENT DOCUMENTS

| AU | 700607 | 1/1999 |
| CA | 2070929 | 12/1993 |

(Continued)

OTHER PUBLICATIONS

Blakers, A., "Solar and wind electricity in Australia", Australian Journal of Environmental Management. 7, 2000, 223-236.

(Continued)

*Primary Examiner* — Ricky D Shafer
(74) *Attorney, Agent, or Firm* — Daniel J. Swirsky; AlphaPatent Associates Ltd.

(57) ABSTRACT

A solar concentrating system for concentrating sunlight by tracking the sun, including concentrator support structure, an annular track mounted on an upper surface of a base, the center of mass of the concentrator support structure being off-axis relative to curvature center of annular track, enclosures provided at corners and comprising a wheel positioned on the track, the enclosure connected to a piston connected to a guiding element placed on the track; a fastening element that when moved towards the track, the guiding element is fastened to the track, and when the fastening element is moved away from the track, the guiding element is released, when the first piston elongates or contracts, the first guiding element is fastened to the track, the second guiding element is released, the wheels of the enclosures rotate from a first location on the track to a second location, thereby rotating the concentrator support structure.

24 Claims, 8 Drawing Sheets

(51) Int. Cl.
*F24J 2/38* (2014.01)
*F24J 2/52* (2006.01)
*F24J 2/46* (2006.01)
*F24J 2/12* (2006.01)
*F24J 2/54* (2006.01)

(52) U.S. Cl.
CPC .. *F24J 2/52* (2013.01); *F24J 2/542* (2013.01); *G02B 7/183* (2013.01); *F24J 2002/109* (2013.01); *F24J 2002/5441* (2013.01); *F24J 2002/5479* (2013.01); *Y02E 10/42* (2013.01); *Y02E 10/47* (2013.01)

(56) References Cited

U.S. PATENT DOCUMENTS

| | | | |
|---|---|---|---|
| 2,872,587 A | | 2/1959 | Stein |
| 3,412,404 A | | 11/1968 | Bergling |
| 3,520,073 A | | 7/1970 | Baader |
| 3,905,352 A | * | 9/1975 | Jahn ............... F24J 2/07 126/400 |
| 4,011,854 A | | 3/1977 | Brantley et al. |
| 4,027,653 A | | 6/1977 | Meckler |
| 4,167,906 A | | 9/1979 | Steinmann et al. |
| 4,171,876 A | | 10/1979 | Wood |
| 4,256,088 A | | 3/1981 | Vindum |
| 4,286,581 A | | 9/1981 | Atkinson, Jr. |
| 4,301,321 A | | 11/1981 | Bartels |
| 4,385,430 A | | 5/1983 | Bartels |
| 4,408,595 A | * | 10/1983 | Broyles ............. F24J 2/12 126/570 |
| 4,463,749 A | | 8/1984 | Sobczak et al. |
| 4,565,104 A | | 1/1986 | Akin |
| 4,691,207 A | | 9/1987 | Timineri |
| 5,281,975 A | | 1/1994 | Hugo |
| 5,325,844 A | | 7/1994 | Rogers et al. |
| 5,578,140 A | | 11/1996 | Yogev et al. |
| 5,757,335 A | | 5/1998 | Kaneff et al. |
| 5,934,271 A | | 8/1999 | Kaneff |
| 7,567,218 B2 | | 7/2009 | Whelan |
| 8,952,307 B2 | * | 2/2015 | Blumenthal ........ F24J 2/16 126/600 |
| 9,039,212 B2 | * | 5/2015 | Blumenthal ....... F24J 2/1047 359/853 |
| 9,086,573 B2 | * | 7/2015 | Blumenthal ........ F24J 2/542 |
| 2001/0036024 A1 | * | 11/2001 | Wood ............... F24J 2/10 359/853 |
| 2003/0122728 A1 | | 7/2003 | Antoine |
| 2004/0031483 A1 | | 2/2004 | Kinoshita |
| 2004/0103680 A1 | | 6/2004 | Lasich |
| 2005/0034751 A1 | | 2/2005 | Gross et al. |
| 2007/0095341 A1 | | 5/2007 | Kaneff |
| 2009/0219218 A1 | | 9/2009 | Kaneff |
| 2009/0314280 A1 | * | 12/2009 | Banerjee ............ F24J 2/12 126/606 |
| 2010/0024861 A1 | * | 2/2010 | Cabanillas Saldana . F24J 2/542 136/244 |
| 2010/0201600 A1 | | 8/2010 | Kaneff |
| 2011/0235025 A1 | | 9/2011 | Blumenthal et al. |
| 2011/0259318 A1 | | 10/2011 | Kinley |

FOREIGN PATENT DOCUMENTS

| | | |
|---|---|---|
| CH | 190766 A | 5/1937 |
| DE | 3130226 | 2/1983 |
| DE | 102007016297 | 10/2008 |
| FR | 2349047 | 11/1977 |
| GB | 604756 | 7/1948 |
| IL | 175302 | 6/2011 |
| IN | 207761 | 8/2007 |
| WO | WO9411918 | 5/1994 |
| WO | WO9602797 | 2/1996 |
| WO | WO03022578 | 3/2003 |
| WO | WO2004013547 | 2/2004 |
| WO | WO2005043671 | 5/2005 |
| WO | WO2007022756 | 3/2007 |
| WO | WO2009146511 | 12/2009 |
| WO | WO2010115237 | 10/2010 |
| WO | WO2011000045 | 1/2011 |

OTHER PUBLICATIONS

Clique.—Clique Solar, 2012, Clique Solar Heat for Industrial Process Applications [Online] Retrieved Jun. 18, 2012, from http://www.clique.in/ARUN%20PROFILE.pdf.

Kaneff S , "Multi-megawatt dish-based solar thermal electricity generating plant with optional cogeneration", proceedings of 10th SolarPACES Int, 2000.

Kaneff S. "Solar thermal power generation and sea water desalination", University of Sharjah Journal of Pure & Applied Sciences vol. 20 2, No. 2., Jun. 2005.

Kedare, S. B., Paranjpe, A. D. & Porwal, R. (Apr. 26, 2006). ARUN Solar Concentrator for Industrial Process Heat Applications. Retrieved Jun. 18, 2012, from MNRE: http://mnre.gov.in/file-manager/UserFiles/arun_article_kedare.pdf.

Lovegrove et al. , "Paraboloidal dish solar concentrators for multi-megawatt power generation", Solar World Congress, Beijing, Sep. 18-22, 2007.

Tennant-Wood, R.,"Following the sun: the pioneering years of solar energy Research at the Australian National University, 1970-2005", Acton, A.C.T. : ANU E Press, 2012.

* cited by examiner

SOLAR CONCENTRATING SYSTEMS

CROSS-REFERENCE TO RELATED APPLICATIONS

This application is a U.S. National Phase Application under 35 U.S.C. 371 of International Application No. PCT/IL2013/000008, which has an international filing date of Jan. 21, 2013, and which claims the benefit of priority of U.S. Provisional Patent Application No. 61/589,352, filed on Jan. 22, 2012, entitled "Rotating Assemblies," which is incorporated herein by reference in its entirety.

FIELD OF THE INVENTION

The present invention relates generally to solar concentrating systems.

BACKGROUND OF THE INVENTION

Solar concentrating systems use concentrators such as lenses, reflectors or mirrors, and tracking systems to focus sunlight onto a focal location.

SUMMARY OF THE INVENTION

There is thus provided in accordance with an embodiment of the present disclosure a solar concentrating system for concentrating sunlight by tracking the sun, including a concentrator support structure, formed with a lower portion at a first peripheral end thereof, and an upper portion at a second peripheral end thereof, the center of mass of the concentrator support structure may be more proximal to the lower portion than the upper portion, a concentrator mounted on the concentrator support structure, a base, an annular track mounted on an upper surface of the base, the center of mass of the concentrator support structure may be off-axis relative to a curvature center of the annular track, a frame formed with first and second adjacent corners and third and fourth oppositely facing corners, a first enclosure may be provided at the first corner, a second enclosure may be provided at the second corner, a third enclosure may be provided at the third corner and a fourth enclosure may be provided at the fourth corner, the enclosures may include at least one wheel, each of the wheels may be positioned on the track, the first peripheral end of the concentrator support structure may be mounted on the first and second adjacent corners of the frame, the first and second enclosures may be pressed down by weight of the concentrator support structure to a greater degree than the third and fourth enclosures, thereby providing a greater degree of friction between the wheels of the first and second enclosures and the track than a degree of friction between the wheels of the third and fourth enclosures and the track, the first enclosure may be connected to a first piston, which first piston may be connected to a first guiding element, the first guiding element may be placed on the track, the second enclosure may be connected to a second piston which second piston may be connected to a second guiding element, the second guiding element may be placed on the track, at least one of the first and second guiding elements may be formed with at least one fastening element wherein, when the fastening element may be moved towards the track, the guiding element may be fastened to the track, and when the fastening element may be moved away from the track, the guiding element may be released from the track, wherein, when the first piston elongates or contracts and the first guiding element may be fastened to the track and the second guiding element may be released, the wheels of the first and second enclosure rotate from a first location on the track to a second location on the track, thereby rotating the concentrator support structure around an axis perpendicular to the ground.

According to an embodiment, the guiding element includes a hydraulic piston for hydraulically controlling movement of the fastening element towards the track and away from the track. Additionally, the guiding element includes at least two fastening elements, each placed at oppositely facing sides of the track. Moreover, the first and second piston and the guiding element piston may be mutually controlled by a single processor.

According to an embodiment, the system includes at least one additional piston for rotating the concentrator support structure around an axis, which may be angular to the axis perpendicular to the ground. Additionally, the first and second piston and the guiding element piston and the least one additional piston, may be mutually controlled by a single processor. Moreover, the first and second piston and the guiding element piston and the least one additional piston, may be hydraulically controlled. Furthermore, the concentrator support structure may be anchored at the first peripheral end thereof to the frame in proximity to the first and second enclosures.

According to an embodiment, the concentrator support structure rotates around the axis perpendicular to the ground at a first rotation from the first location to the second location and thereafter the concentrator support structure rotates around the axis perpendicular to the ground at a second rotation from the second location to a third location, the first rotation and the second rotation may be performed with a time discrepancy therebetween, which may be adjusted according to a light intensity of the sun. Additionally, the wheels may be substantially only subjected to a force in the orientation of the axis perpendicular to the ground. Furthermore, the track may be flexibly mounted on the base for allowing thermal expansion or contraction thereof. Moreover, the concentrator support structure may be designed to track the sun at an accuracy of substantially at least a few milliradian.

There is thus provided in accordance with an embodiment of the present disclosure a method for concentrating sunlight by tracking the sun, including providing a concentrator support structure, formed with a lower portion at a first peripheral end thereof, and an upper portion at a second peripheral end thereat, the center of mass of the concentrator support structure may be more proximal to the lower portion than the upper portion, concentrating sunlight utilizing a concentrator mounted on the concentrator support structure, providing a base, providing an annular track mounted on an upper surface of the base, the center of mass of the concentrator support structure may be off-axis relative to a curvature center of the annular track, providing a frame formed with first and second adjacent corners and third and fourth oppositely facing corners, providing a first enclosure at the first corner, a second enclosure at the second corner, a third enclosure at the third corner and a fourth enclosure at the fourth corner, the enclosures may include at least one wheel, each of the wheels may be positioned on the track, mounting the first peripheral end of the concentrator support structure on the first and second adjacent corners of the frame, the first and second enclosures may be pressed down by weight of the concentrator support structure to a greater degree than the third and fourth enclosures, thereby providing a greater degree of friction between the wheels of the first and second enclosures and the track than a degree of friction between the wheels of the third and fourth enclosures and the track, connecting the first enclosure to a first piston, which first piston may be connected to a first guiding element, the first guiding element may be placed on the track, connecting the second enclosure to a second piston which second piston may be connected to a second guiding element, the second guiding element may be placed on the track, at least one of the first and second guiding elements formed with at least one fastening element wherein, when the fastening element may be moved towards the track, the guiding element may be fastened to the track, and when the fastening element may be moved away from the track, the guiding element may be released from the track, elongating or contracting the first piston and fastening the first guiding element to the track and releasing the second guiding element, rotating the wheels of the first and second enclosure from a first location on the track to a second location on the track, thereby rotating the concentrator support structure around an axis perpendicular to the ground.

BRIEF DESCRIPTION OF THE DRAWING

The present subject matter will be understood and appreciated more fully from the following detailed description, taken in conjunction with the drawings in which.

DETAILED DESCRIPTION OF EMBODIMENTS

In the following description, various aspects of the present subject matter will be described. For purposes of explanation, specific configurations and details are set forth in order to provide a thorough understanding of the present subject matter. However, it will also be apparent to one skilled in the art that the present subject matter may be practiced without specific details presented herein without departing from the scope of the present invention. Furthermore, the description omits and/or simplifies some well known features in order not to obscure the description of the subject matter.

Figure 1:
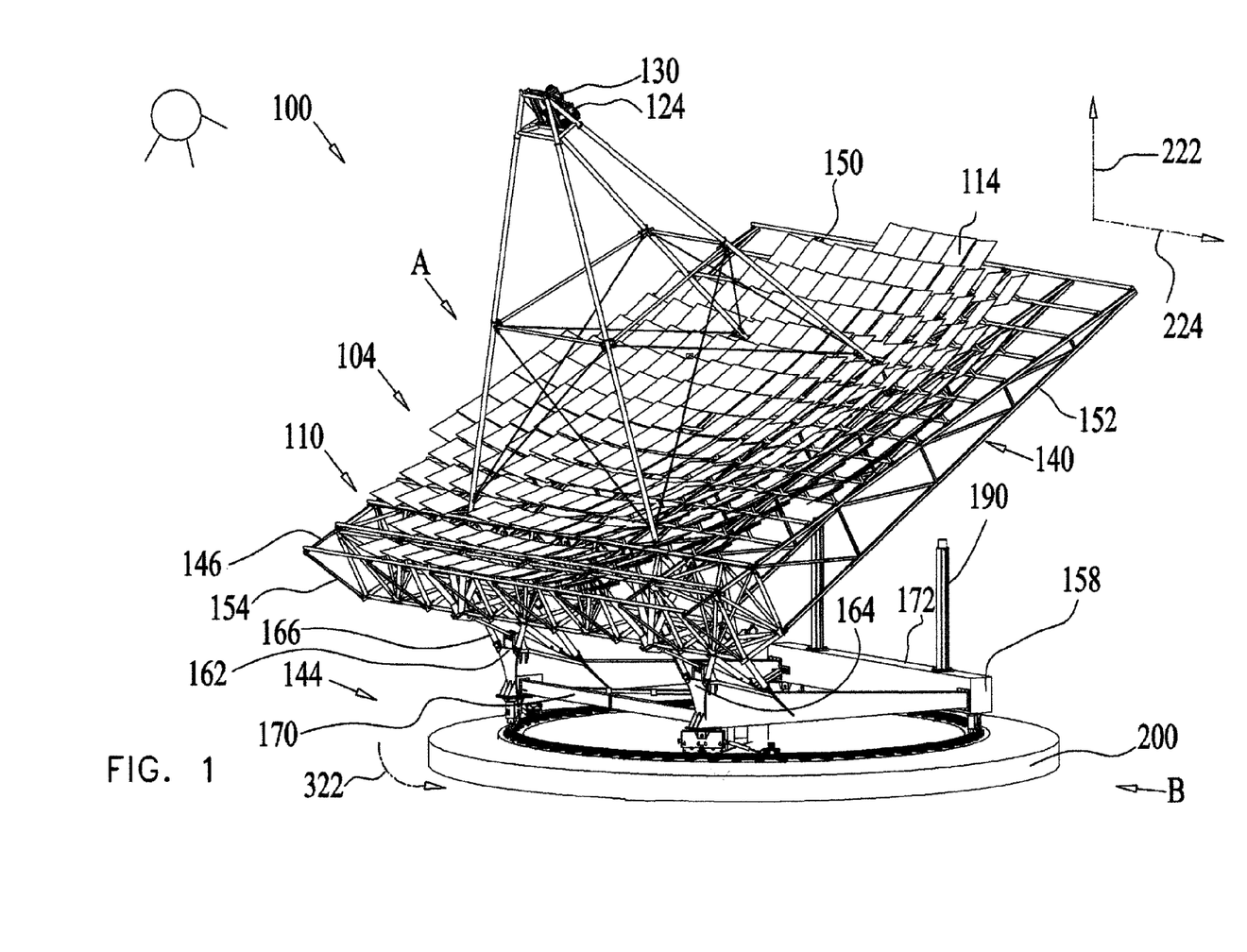
FIG. 1 is a simplified pictorial illustration of a solar concentrating system, constructed and operative in accordance with an embodiment of the present disclosure.
Figure 2:
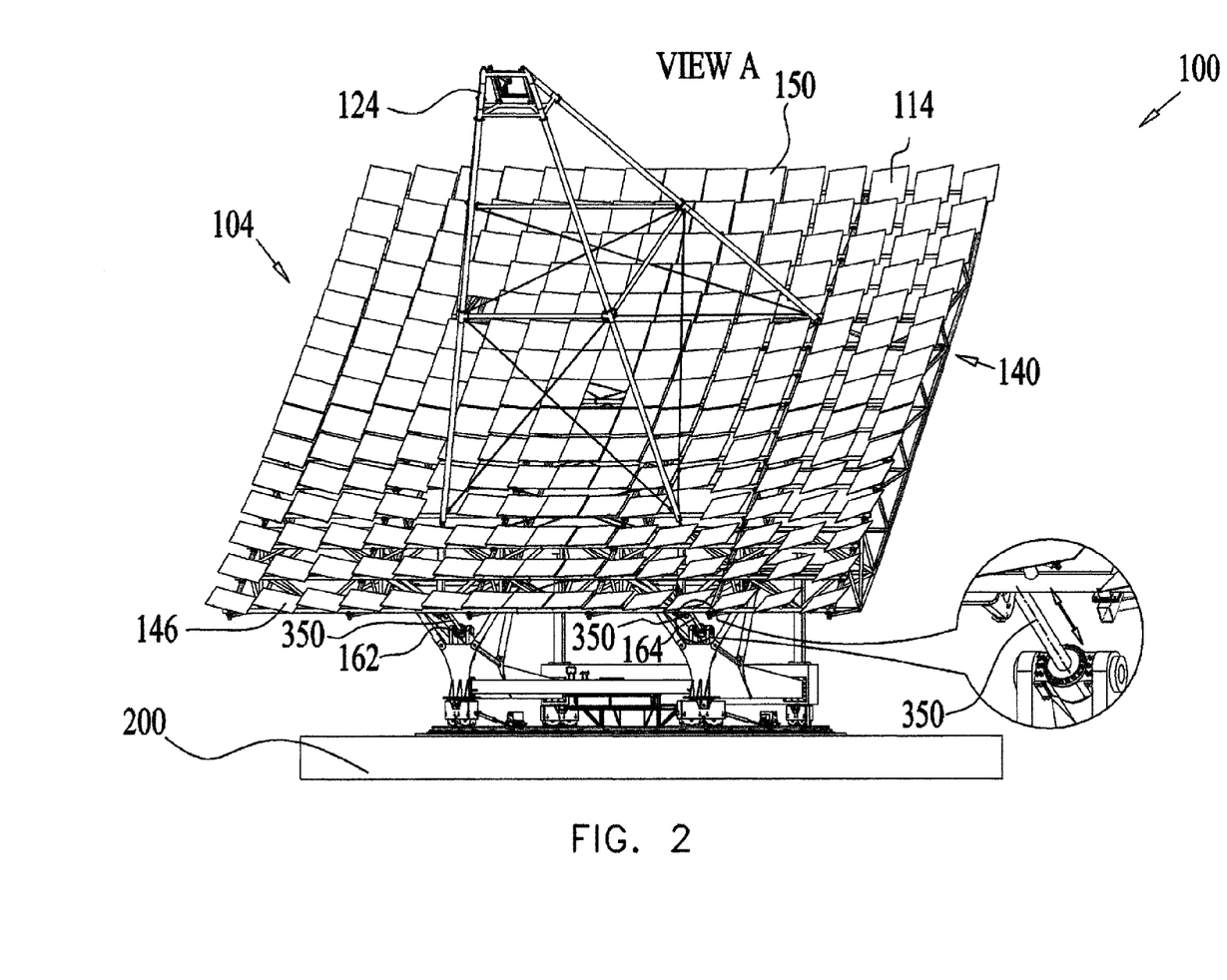
FIG. 2 is a simplified pictorial illustration of the solar concentrating system of FIG. 1, shown in the orientation of arrow A in FIG. 1, in accordance with an embodiment of the present disclosure.
Figure 3:
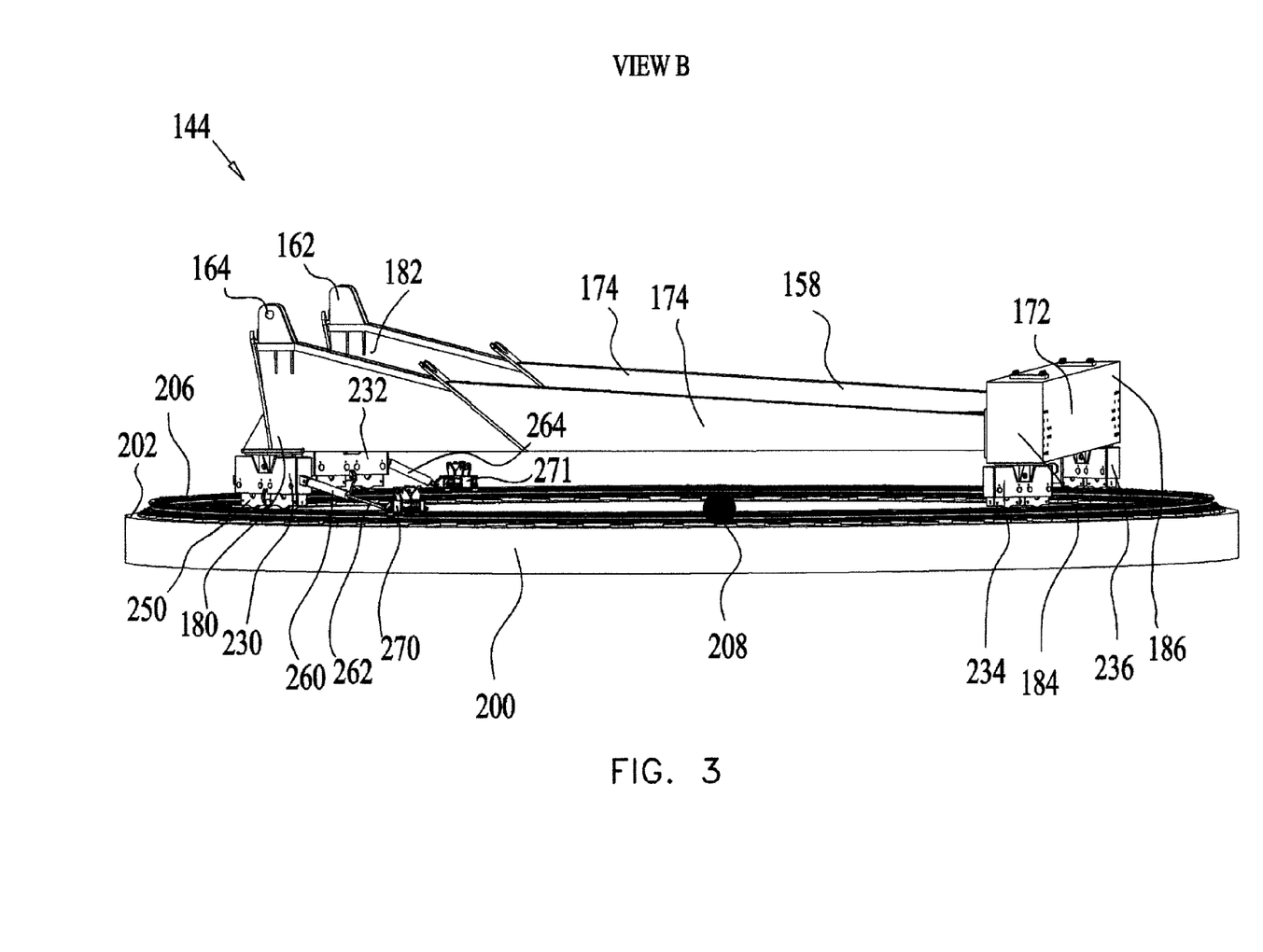
FIG. 3 is a simplified pictorial illustration of a base assembly of the solar concentrating system of FIG. 1, shown in the orientation of arrow B in FIG. 1, in accordance with an embodiment of the present disclosure.
Figure 4A:
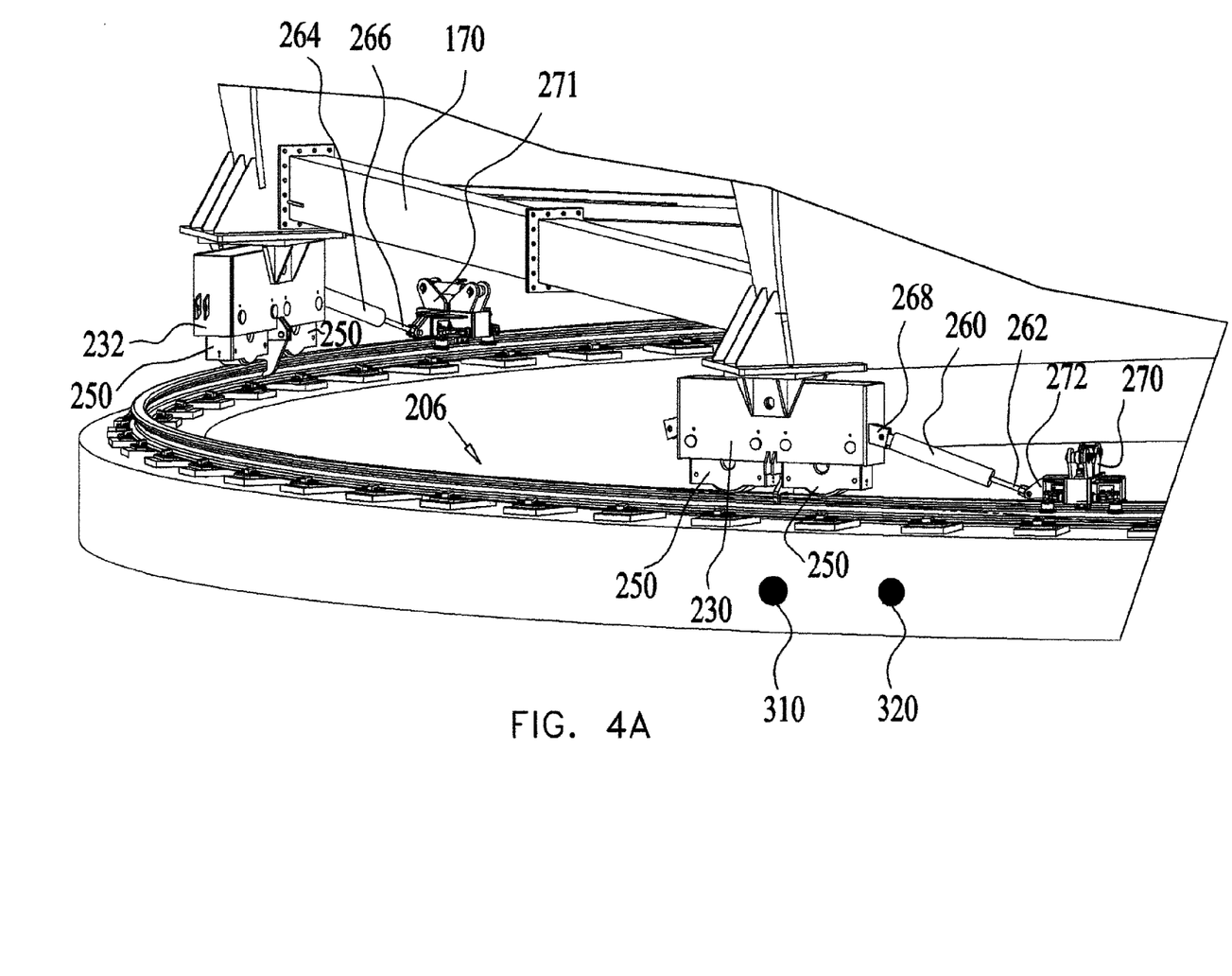
FIGS. 4A-4D are simplified cut-away pictorial illustrations of the base assembly of FIG. 3 at a first, second, third and fourth operational step, respectively, in accordance with an embodiment of the present disclosure.
Figure 4B:
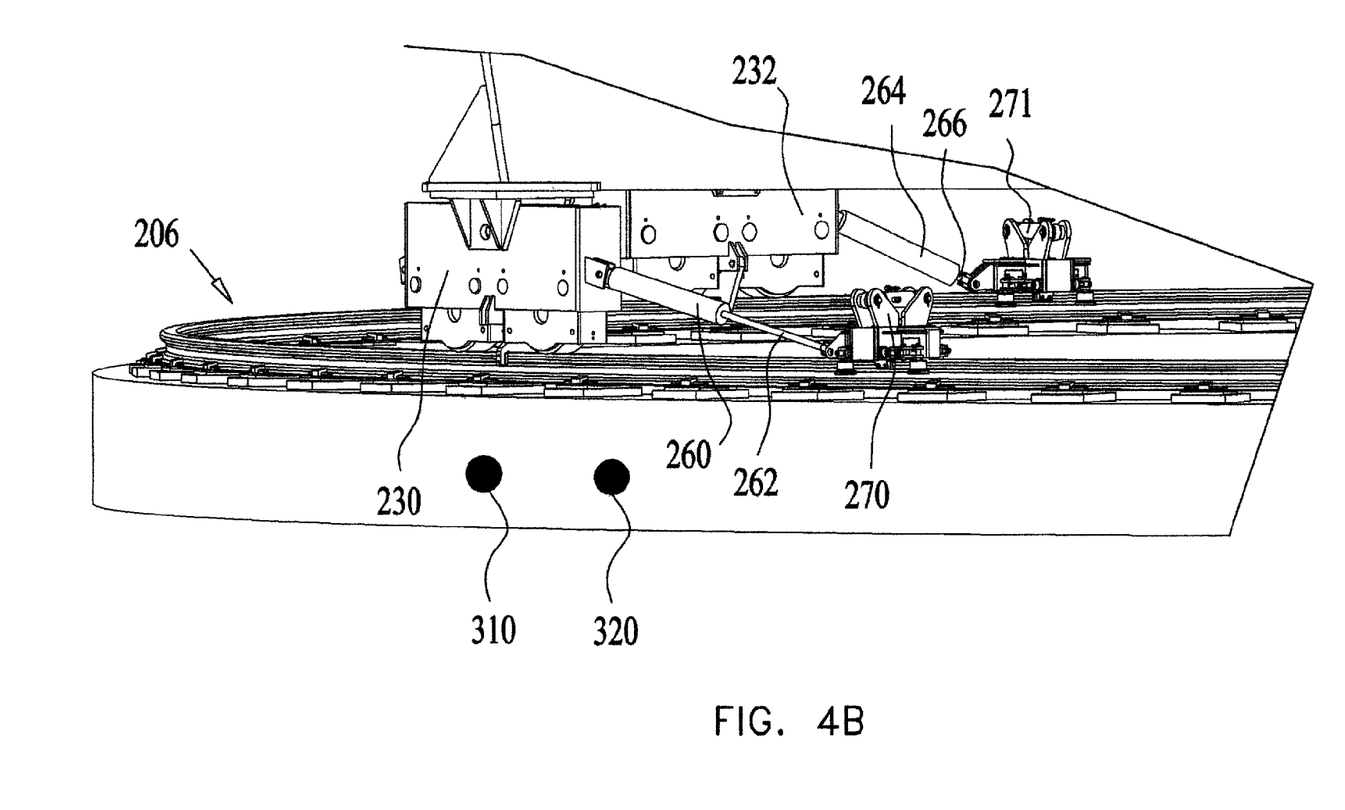
Figure 4C:
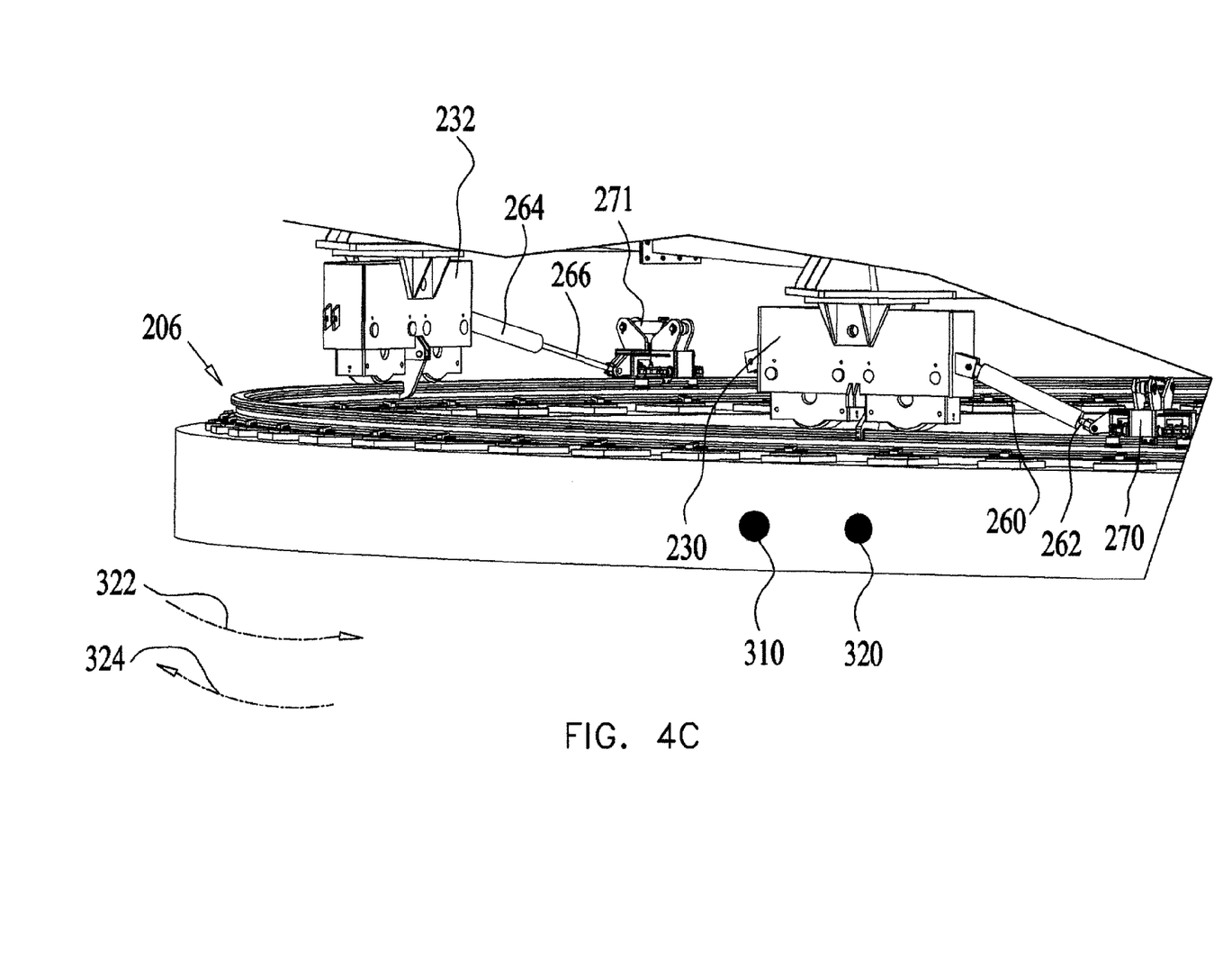
Figure 4D:
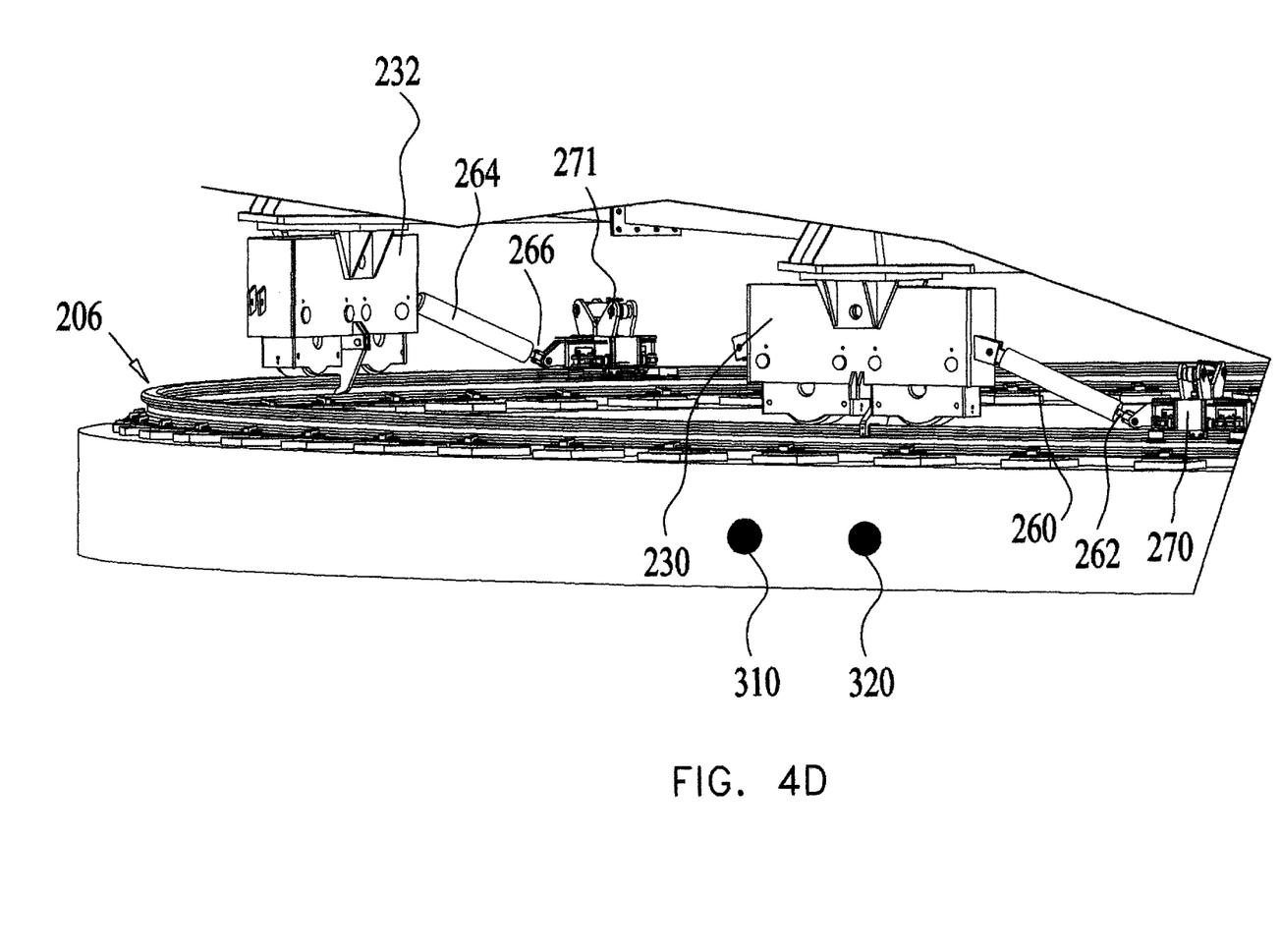
Figures 5A, 5B:
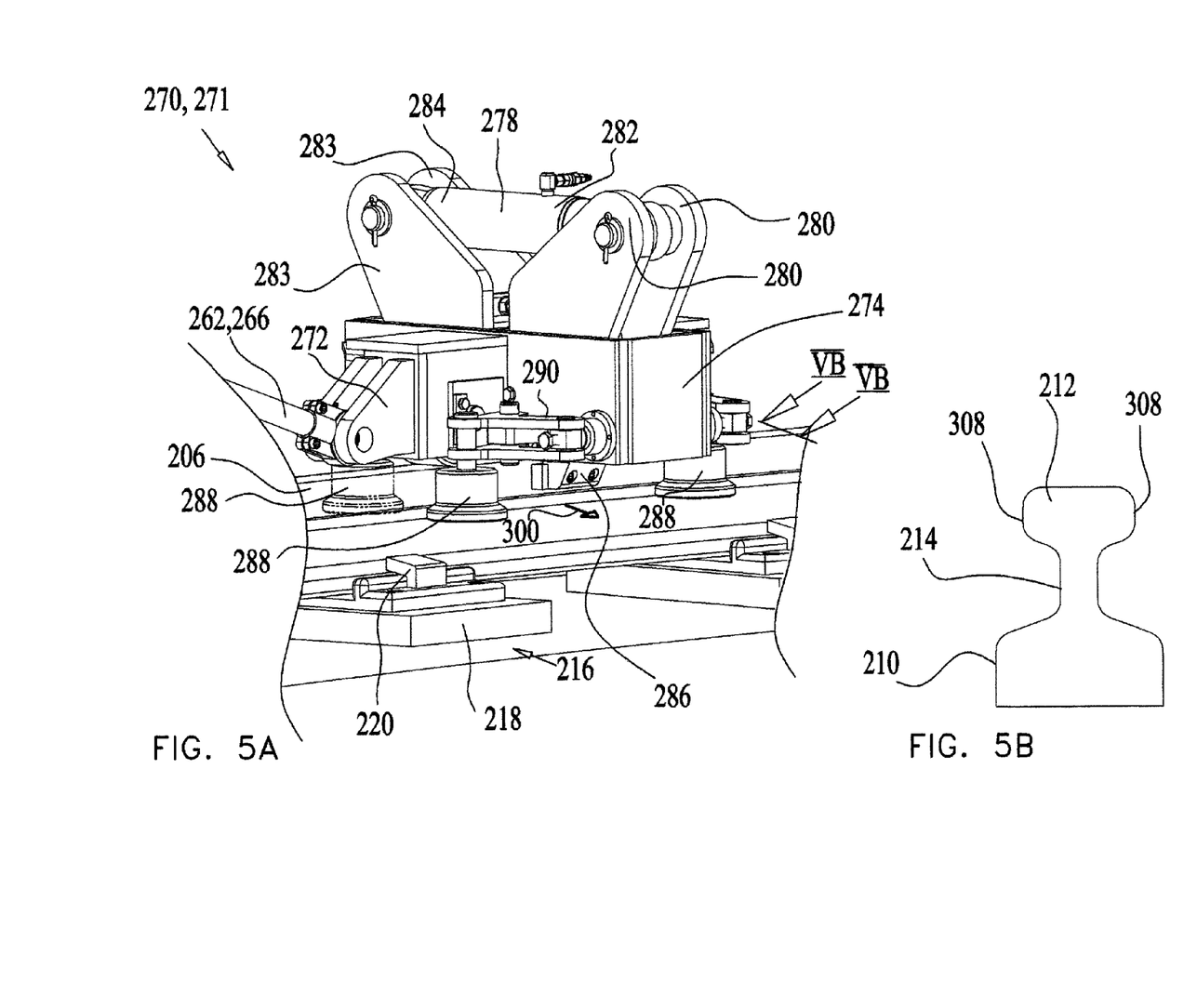
FIGS. 5A and 5B are a simplified pictorial illustration of a guiding element of the solar concentrating system of FIG. 1, and a sectional illustration taken along lines 5B-5B in FIG. 5A, in accordance with an embodiment of the present disclosure.

Reference is now made to FIGS. 1-5B, which are a simplified pictorial illustration of a solar concentrating system, a simplified pictorial illustration of the solar concentrating system of FIG. 1, shown in the orientation of arrow A in FIG. 1, and a simplified pictorial illustration of a base assembly of the solar concentrating system of FIG. 1, shown in the orientation of arrow B in FIG. 1, in accordance with an embodiment of the present disclosure, simplified cut-away pictorial illustrations of the base assembly of FIG. 3 at a first, second, third and fourth operational step, respectively, and a simplified pictorial illustration of a guiding element of the solar concentrating system of FIG. 1, and a sectional illustration taken along lines 5B-5B in FIG. 5A, in accordance with an embodiment of the present disclosure.

As seen in FIG. 1, a solar concentrator system 100 may comprise a concentrator 104. Concentrator 104 may comprise an array 110 of a plurality of concentrating reflectors 114 wherein each of the reflectors 114 may be provided to concentrate sunlight impinging thereon and reflect the concentrated sunlight back to a focal location 124. In a non-limiting example, in the embodiment shown in FIG. 1, a solar receiver 130 may be mounted at focal location 124. The receiver 130 is provided to heat a working fluid therein utilizing the thermal energy of the concentrated light. It is appreciated that the thermal energy of the concentrated light may be utilized to in any suitable thermal consumption system (not shown).

The concentrator 104 may be formed in any suitable shape, such as substantially a dish, a parabola-like shape, or a parallelogram-like shape, for example. In the embodiment of FIGS. 1-5B concentrator 104 is formed in a rectangle-like shape. In a non-limiting example the concentrator may be formed as a rectangle-like shape with a relatively large length in the range of 300-900 square meters, for example.

The concentrator 104 may be mounted on a concentrator support structure 140. The concentrator support structure 140 may be formed and arranged in any suitable manner for supporting a load thereon. In some embodiments, the concentrator support structure 140 may be formed as a space structure or space frame. A space structure generally comprises a three-dimensional truss composed of linear elements subjected to compression or tension. Additionally, the concentrator support structure 140 may be formed as a planar truss, as a tessellated system, as any suitable latticed structure or as a solid structure comprising plates.

The concentrator support structure 140 may be mounted on a base assembly 144.

Concentrator support structure 140 generally comprises a lower portion 146 at a first peripheral end thereof and in proximity to the base assembly 144 and an upper portion 150 at a second peripheral end thereof, relatively distal to the base assembly 144.

Concentrator support structure 140 may be formed of a single or plurality of mutually aligned substructures 152. In some embodiments, the substructures 152 may taper towards the upper portion 150. As seen in FIG. 1, the substructures 152 are formed in a substantially triangular shape, such that a base 154 of the triangle is at the lower portion 146 and the opposite end of the triangle is at the upper portion 150. It is apparent from FIG. 1 that a mass of the substructures 152, and hence the concentrator support structure 140, is greater at the lower portion 146 and recedes towards the upper portion 150.

It is appreciated that the substructures 152 may be formed in any suitable shape besides a triangle, such as a trapezoid or any other shape wherein the mass of the concentrator support structure 140 is largest at the lower portion 146 and recedes towards the upper portion 150.

Concentrator support structure 140 may be mounted on a frame 158 of the base assembly 144 and may be anchored thereto at anchoring locations 162 and 164, via support rods 166 or any other suitable means.

The frame 158 may be configured in a substantially rectangular shape with respective front and back bars 170 and 172 connected therebetween by side bars 174 (FIG. 3). A first and second corner 180 and 182 are defined at front bar 170 and a third and fourth corner 184 and 186 are defined at back bar 172. As described hereinabove, the mass of the concentrator support structure 140 is greater at the lower portion 146 thereof in proximity to the front bar 170. To prevent tilting of concentrator support structure 140 towards the orientation of the front bar 170, such as in the event of strong winds, the back bar 172 may be larger and/or heavier than the front bar 170 (FIG. 3) and may be formed of enforced concrete or any other suitable material. The back bar 172 may be formed of any suitable material or shape to prevent tilting of the concentrator support structure 140. Front bar 170 may be formed of any suitable material, such as steel.

From the back bar 172 may extend supporting rods 190 so as to support the concentrator support structure 140 wherein the solar concentrator system 100 is not tracking the sun, such as wherein the solar concentrator system 100 is inoperative, typically at night, for example.

The base assembly 144 may comprise a base 200, which may be placed on the ground or any other suitable plane. The base 200 may be formed of concrete or any other suitable material. On an upper surface 202 (FIG. 3) of the base 200 may be formed a generally annular track 206 defining a curvature center 208 thereof.

As described hereinabove, the mass of the concentrator support structure 140 is greater at the lower portion 146. Accordingly, a center of mass of the concentrator support structure 140 is closer to the lower portion 146 and is off-axis relative to the curvature center 208 of the annular track 206.

A profile of the track 206 may be formed in any suitable shape for supporting the relatively heavy mass of the concentrator support structure 140. In a non-limiting example, the track 206 may be formed with an asymmetrical rounded profile as shown in FIG. 5B, wherein a bottom portion 210 of the profile is wider than a rounded top portion 212 and an intermediate, elongated portion 214 connects the respective bottom and top portions 210 and 212. It is appreciated that any suitable profile may be used, such as, for example, any profile used for rails, which may comprise bullhead rails, grooved rails, vignoles rails, flanged T rails, bridge rails and barlow rails.

The track 206 may be formed of any suitable material, such as a steal used for crane rails, such as a steal designed for supporting heavy weight and pressures. In a non-limiting example, the track 206 may be formed of rail grade steel supporting approximately 850 MegaPascal.

In accordance with an embodiment, the track 206 is flexibly mounted on the base 200 via mounting elements 216 (FIG. 5A) so as to allow the track 206 to thermally expand and contract when subjected to harsh environmental conditions, such as heat or cold. This may minimize thermal expansion and contraction stresses that would have occurred had the track 206 been fixedly mounted on the base 200. In some embodiments, the mounting elements 216 may comprise a mounting base 218 which may be formed or covered with a material with a relatively high friction coefficient, such as rubber. From the mounting base 218 may protrude an inverted L-shaped clasp 220 placed on the bottom portion 210 of the track 206, thereby mounting the track 206 on to the base 200. Thus it is seen that the mounting elements 216 secures the track 206 to the base 200 yet is not fixed thereto.

In accordance with an embodiment, the concentrator support structure 140 may rotate in a tracking system for tracking the sun, thereby focusing the sunlight by the concentrator 104. The concentrator support structure 140 may be designed to rotate in any suitable orientation, such as in a dual axis tracking system, or a three axis tracking system. In some embodiments, the concentrator support structure 140 rotates around a longitudinal axis 222, generally perpendicular to the plane of the ground. The concentrator support structure 140 may additionally rotate around an axis 224, generally perpendicular or angular to the longitudinal axis 222.

In some embodiments, rotation around the longitudinal axis 222 may be performed by rotating the frame 158 around the track 206. At each of the respective first, second, third and fourth corners 180, 182, 184 and 186 of the frame 158 may be provided a respective first, second, third and fourth enclosure 230, 232, 234 and 236. Each on the enclosures may be harnessed to the first, second, third and fourth corners 180, 182, 184 and 186 of the frame 158 or may be mounted thereto in any suitable manner.

Each of the enclosures may enclose a wheel 250 or any suitable device for rotating the frame 158 on the track 206. In some embodiments, as seen in FIGS. 1-4D, two adjacent wheels 250 may be enclosed in the enclosure, thereby distributing the weight of the frame 158 supported by the wheels 250. The wheels 250 may be placed on the upper portion 212 of the track 206 or any other suitable location.

In some embodiments, the two adjacent wheels 250 may be positioned within the enclosure at a slight angle relative to each other on the plane of the track 206 (which is parallel to the plane of the base 200 and the ground) so as to assume the curvature of the track 206 and thereby ensure both wheels 250 stay on the annular track 206. In a non-limiting example, there may be an angle of approximately 1-5 degrees between the wheels 250.

The wheels 250 within the enclosure may be moved along the track 206 in any suitable manner. According to some embodiments, as shown in FIGS. 1-5B, the first enclosure 230 is engaged with a first piston 260 comprising a shaft 262, which shaft 262 may elongate or contract (FIG. 4A). The second enclosure 232 is engaged with a second piston 264 comprising a shaft 266, which shaft 266 may elongate or contract. The first and second pistons 260 and 264 may be any suitable piston, such as a hydraulic or pneumatic piston, for example. The first and second pistons 260 and 264 may be engaged with the respective first and second enclosures 230 or 232 via a hinge 268 (FIGS. 4A-4D) at a first side thereof or in any other suitable manner.

At a second side thereof the first and second pistons 260 and 264 may be engaged with respective first and second guiding elements 270 and 271, via a lug 272 or in any other suitable manner.

Each of the first and second guiding elements 270 and 271 may comprise a main body 274 (FIG. 5A), which may be placed on the upper portion 212 of the track 206. The main body 274 may be provided with a piston 278, which may be a pneumatic or hydraulic piston or any suitable element which is designed to elongate and contract. The piston 278 may be rigidly attached to two oppositely facing pair of plates 280 at a first side 282 thereof and rigidly attached to two oppositely facing pair of plates 283 at a second side 284 thereof.

On a bottom portion of each of the pair of plates 280 and 283 may be provided a fastening element 286. At a bottom portion of the main body 274 may be provided at least one wheel 288. In some embodiments, as seen in FIG. 5A, two wheels 288 may be provided at the first side 282 of the main body 274 and two wheels 288 may be provided at a second side 284 of the main body 274, such as the wheel 288 shown with a dashed lines at the second side 284.

The wheels 288 may be attached to the main body 274 via lugs 290, which may be harnessed to the main body 274.

When the piston 278 is contracted, the plates 280 and 283 may be extended outwardly in the orientation of arrows 300, away from the track 206. In turn, the fastening elements 286 may be moved away from the track 206, thereby releasing the first or second guiding element 270 or 271 from the track 206.

When the piston 278 is elongated, the plates 280 may turn inwardly in the opposite orientation of arrow 300, towards the track 206. In turn, the fastening elements 286 move towards the track 206 in proximity to sides 308 of the upper portion 212 of the track 206, thereby fastening the first or second guiding element 270 or 271 to the track 206.

The wheels 288 may be provided for moving the guiding element 270 or 271 along the track 206. It is appreciated that the wheels 288 may be obviated.

It is appreciated that the first or second guiding element 270 or 271 may be fastened or released from the track 206 in any suitable manner. For example, the fastening elements 286 may be lifted off the track 206 for release thereof. The fastening elements 286 may be replaced by any suitable element for fastening or releasing the first or second guiding element 270 or 271 from the track 206.

In accordance with some embodiments, rotation around the longitudinal axis 222 may be performed by rotating the frame 158, and hence the concentrator support structure 140, around the track 206 by reciprocally moving the two first and second enclosures 230 and 232 by elongation or contraction of the piston shaft 262 and 266 and release or fastening the guiding elements 270 and 271 from the track 206.

In a non-limiting example, the operation of the reciprocal movement of the two first and second enclosures 230 and 232 from a first location 310 to a second location 320 on the track 206, is shown at a first, second, third and fourth operational step in respective FIGS. 4A-4D.

As seen in FIG. 4A, at a first operational step, the first enclosure 230 is placed on the track 206 above a first location 310. The first piston shaft 260 is in a contracted position. The first guiding element 270 is fastened to the track 206. The second piston shaft 266 is in a contracted position. The second guiding element 271 is fastened to the track 206.

Turning to FIG. 4B, at a second operational step, it is seen that the first guiding element 270 is released and the first piston shaft 262 elongates, thereby pushing the first guiding element 270 along track 206. As the first piston shaft 262 elongates, the second guiding element 271 is released.

As seen in FIG. 4C, at a third operational step, now that the second guiding element 271 is released, the second piston shaft 266 elongates. In tandem, the first guiding element 270 is fastened to the track 206. The first enclosure 230 rotates along the track 206 from first location 310 to a second location 320, by contraction of the first piston shaft 262. The rotation of the first enclosure from first location 310 to second location 320 rotates the concentrator 104 (FIG. 1) in the orientation of an arrow 322.

Turning to FIG. 4D, at a fourth operational step, following the rotation of the first enclosure 230 and in turn, the rotation of the second enclosure 232, it is seen that the second piston shaft 266 contracts, thereby moving the second guiding element 271 towards the second enclosure 232. Thereafter, the second guiding element 271 may be fastened to the track 206.

It is noted that the rotational movement of the concentrator in the orientation of an arrow 324, which is opposite to the orientation of arrow 322, may be performed according to the operation described in reference to FIGS. 4A-4D, mutatis mutandis.

It is further noted that the first enclosure 230 may be interchanged with the second enclosure 232.

In some embodiments, the rotation around the longitudinal axis 222, as described in reference to FIGS. 4A-4D, may be performed continuously. In some embodiments, the rotation around the longitudinal axis 222, as described in reference to FIGS. 4A-4D, may be performed discontinuously with a time discrepancy between each rotation, such as a first and a second rotation. A first rotation may be defined as the rotation from first location 310 to second location 320. A second rotation may be defined as the rotation from the second location 320 to a third location along the track 206. Discontinuous rotation allows for adjusting the rotation of the concentrator 104 in accordance with the intensity of the sunlight. For example, wherein there is less sunlight, such as during the winter, the time discrepancy between each rotation may be greater, such as a few minutes, than wherein there is more sunlight, such as during the summer, wherein the time discrepancy between each rotation may be less, such as a few seconds.

In accordance with some embodiments, as seen in FIGS. 1-4D, the first and second pistons 260 and 264 and first and second guiding elements 270 and 271 may be engaged with the respective first and second enclosures 230 and 232, which are placed at the respective first and second corners 180 and 182 of the frame 158. As described hereinabove, the mass of the substructures 152, and hence the concentrator support structure 140, is greater at the lower portion 146 thereof. Accordingly, the first and second enclosures 230 and 232 are pressed down by weight of the concentrator support structure 140 to a greater degree than the third and fourth enclosures 234 and 236. Therefore, there is a greater degree of friction between the wheels of the first and second enclosures 230 and 232 and the track 206 than the degree of friction between the wheels of the third 234 and fourth 236 enclosures and the track 206, granting greater stability to first and second enclosures 230 and 232 on the track 206.

It is thus greatly advantageous to perform the rotation of the concentrator support structure 140 having the first and second pistons 260 and 264 and first and second guiding elements 270 and 271 engaged with the respective first and second enclosures 230 and 232, since the first and second enclosures 230 and 232 are most stable on the track 206, ensuring stable and reliable rotation of the concentrator support structure 140. Thereby, the concentrator support structure 140 is designed to track the sun at an accuracy of substantially at least a few milliradian.

Additionally, as described hereinabove, the concentrator support structure 140 is anchored to the frame 158 at anchoring locations 162 and 164. The anchoring locations 162 and 164 are substantially above or proximal to the first and second enclosures 230 and 232. Therefore, the first and second enclosures 230 and 232 are subjected to fewer vibrations and undesired movements, than the third and fourth enclosures 234 and 236, which are placed away from the anchoring locations 162 and 164. The vibrations and undesired movements may be caused by harsh environmental conditions, or by the concentrator support structure 140, for example. Thereby, the concentrator support structure 140 is designed to track the sun at an accuracy of at least a few milliradian.

In some embodiments, the wheels 250 remain on the track 206 substantially only due to the pressing downwards of the weight of the concentrator support structure 140 and the weight of the back bar 172 of the frame 158. There are substantially no forces exerted on the wheels 250 other than the weight of the concentrator support structure 140 and the weight of the back bar 172 and hence substantially no forces in an orientation other than axis 222 is exerted on the wheels. Thus the wheels 250 or enclosures 230, 232, 234 or 236 are not utilized to stabilize or support the concentrator support structure 140 and thus have greater freedom to rotate on track 206. An additional advantage is that the wheels 250 are not attached to the track 206, thereby preventing undesired thermal expansion or contraction stresses, as described hereinabove.

In accordance with an embodiment, concentrator support structure 140 may rotate around horizontal axis 224 in addition to rotation around longitudinal axis 222. The rotation may be facilitated in any suitable manner, such as by a single or more additional pistons 350 (FIG. 2) protruding from base 200 and rotationally connected to the concentrator support structure 140 in any suitable manner. For example, a piston 350 may be fixed to the concentrator support structure 140 in proximity to each of anchoring locations 162 and 164. The pistons 350 are configured to elongate or contract for rotating the concentrator support structure 140 around horizontal axis 224. It is noted that the pistons 350 may be designed to rotate the concentrator support structure 140 around any axis angular to the longitudinal axis 222.

In some embodiments, the first and second pistons 260 and 264 and guiding element piston 278 may all be hydraulic or pneumatic pistons and may be designed to be controlled by the same control system comprising a processor (not shown).

In some embodiments, the additional pistons 350, first and second pistons 260 and 264 and guiding element piston 278 may all be hydraulic or pneumatic pistons and may be designed to be controlled by the same control system comprising a processor (not shown).

In accordance with an embodiment, the base assembly 144 may be integrally formed with the concentrator support structure 140, thereby forming the solar concentrator system 100 as a single, mutually controlled device employing the same control system comprising a processor. Thereby, the concentrator support structure 140 is designed to track the sun at an accuracy of substantially at least a few milliradian.

It will be appreciated by persons skilled in the art that the present invention is not limited by what has been particularly shown and described herein above. Rather the scope of the present invention includes both combinations and subcombinations of the various features described hereinabove as well as variations and modifications which would occur to persons skilled in the art upon reading the specifications and which are not in the prior art.

The invention claimed is:

1. A solar concentrating system for concentrating sunlight by tracking the sun, comprising:
    a concentrator support structure, formed with a lower portion at a first peripheral end thereof, and an upper portion at a second peripheral end thereof,
    the center of mass of the concentrator support structure being more proximal to the lower portion than the upper portion;
    a concentrator mounted on the concentrator support structure;
    a base;
    an annular track mounted on an upper surface of the base,
    the center of mass of the concentrator support structure being off-axis relative to a curvature center of the annular track;
    a frame formed with first and second adjacent corners and third and fourth oppositely facing corners;
    a first enclosure being provided at the first corner, a second enclosure being provided at the second corner, a third enclosure being provided at the third corner and a fourth enclosure being provided at the fourth corner, the enclosures comprising at least one wheel,
    each of the wheels being positioned on the track,
    the first peripheral end of the concentrator support structure being mounted on the first and second adjacent corners of the frame, the first and second enclosures being pressed down by weight of the concentrator support structure to a greater degree than the third and fourth enclosures, thereby providing a greater degree of friction between the wheels of the first and second enclosures and the track than a degree of friction between the wheels of the third and fourth enclosures and the track,
    the first enclosure being connected to a first piston, said first piston is connected to a first guiding element, the first guiding element being placed on the track,
    the second enclosure being connected to a second piston, said second piston connected to a second guiding element, the second guiding element being placed on the track;
    at least one of the first and second guiding elements formed with at least one fastening element wherein, when the fastening element is moved towards the track, the guiding element is fastened to the track, and when the fastening element is moved away from the track, the guiding element is released from the track,
    wherein, when the first piston elongates or contracts and the first guiding element is fastened to the track and the second guiding element is released, the wheels of the first and second enclosure rotate from a first location on the track to a second location on the track, thereby rotating the concentrator support structure around an axis substantially perpendicular to the ground.

2. A system according to claim 1 wherein the guiding element comprises a hydraulic piston for hydraulically controlling movement of the fastening element towards the track and away from the track.

3. A system according to claim 2 wherein the first and second piston and the guiding element piston are mutually controlled by a single processor.

4. A system according to claim 2, and comprising at least one additional piston for rotating the concentrator support structure around an axis, which is angular to an axis perpendicular to the ground.

5. A system according to claim 4 wherein the first and second piston and the guiding element piston and the least one additional piston, are mutually controlled by a single processor.

6. A system according to claim 4 wherein the first and second piston and the guiding element piston and the least one additional piston, are hydraulically controlled.

7. A system according to claim 1 wherein the guiding element comprises at least two fastening elements, each placed at oppositely facing sides of the track.

8. A system according to claim 1 wherein the concentrator support structure is anchored at the first peripheral end thereof to the frame in proximity to the first and second enclosures.

9. A system according to claim 1 wherein the concentrator support structure rotates around the axis perpendicular to the ground at a first rotation from the first location to the second location and thereafter the concentrator support structure rotates around the axis perpendicular to the ground at a second rotation from the second location to a third location, the first rotation and the second rotation is performed with a time discrepancy therebetween, which is adjusted according to a light intensity of the sun.

10. A system according to claim 1 wherein the wheels are substantially only subjected to a force in an orientation of the axis perpendicular to the ground.

11. A system according to claim 1 wherein the track is flexibly mounted on the base for allowing thermal expansion or contraction thereof.

12. A system according to claim 1 wherein the concentrator support structure is designed to track the sun at an accuracy of substantially at least a few milliradian.

13. A method for concentrating sunlight by tracking the sun, comprising:
   providing a concentrator support structure, formed with a lower portion at a first peripheral end thereof and an upper portion at a second peripheral end thereof, the center of mass of the concentrator support structure being more proximal to the lower portion than the upper portion;
   concentrating sunlight utilizing a concentrator mounted on the concentrator support structure;
   providing a base;
   providing an annular track mounted on an upper surface of the base, the center of mass of the concentrator support structure being off-axis relative to a curvature center of the annular track;
   providing a frame formed with first and second adjacent corners and third and fourth oppositely facing corners;
   providing a first enclosure at the first corner, a second enclosure at the second corner, a third enclosure at the third corner and a fourth enclosure at the fourth corner, the enclosures comprising at least one wheel, each of the wheels being positioned on the track,
   mounting the first peripheral end of the concentrator support structure on the first and second adjacent corners of the frame, the first and second enclosures being pressed down by weight of the concentrator support structure to a greater degree than the third and fourth enclosures, thereby providing a greater degree of friction between the wheels of the first and second enclosures and the track than a degree of friction between the wheels of the third and fourth enclosures and the track,
   connecting the first enclosure to a first piston, said first piston is connected to a first guiding element, the first guiding element being placed on the track,
   connecting the second enclosure to a second piston, said second piston connected to a second guiding element, the second guiding element being placed on the track, at least one of the first and second guiding elements formed with at least one fastening element wherein, when the fastening element is moved towards the track, the guiding element is fastened to the track, and when the fastening element is moved away from the track, the guiding element is released from the track,
   elongating or contracting the first piston and fastening the first guiding element to the track and releasing the second guiding element,
   rotating the wheels of the first and second enclosure from a first location on the track to a second location on the track, thereby rotating the concentrator support structure around an axis perpendicular to the ground.

14. A method according to claim 13 wherein the guiding element comprises a hydraulic piston for hydraulically controlling movement of the fastening element towards the track and away from the track.

15. A method according to claim 14 wherein the first and second piston and the guiding element piston are mutually controlled by a single processor.

16. A method according to claim 14, and comprising at least one additional piston for rotating the concentrator support structure around an axis, which is angular to an axis perpendicular to the ground.

17. A method according to claim 16 wherein the first and second piston and the guiding element piston and the least one additional piston, are mutually controlled by a single processor.

18. A method according to claim 16 wherein the first and second piston and the guiding element piston and the least one additional piston, are hydraulically controlled.

19. A method according to claim 13 wherein the guiding element comprises at least two fastening element, each placed at oppositely facing sides of the track.

20. A method according to claim 13 wherein the concentrator support structure is anchored at the first peripheral end thereof to the frame in proximity to the first and second enclosures.

21. A method according to claim 13 wherein the concentrator support structure rotates around the axis perpendicular to the ground at a first rotation from the first location to the second location and thereafter the concentrator support structure rotates around the axis perpendicular to the ground at a second rotation from the second location to a third location, the first rotation and the second rotation is performed with a time discrepancy therebetween, which is adjusted according to a light intensity of the sun.

22. A method according to claim 13 wherein the wheels are substantially only subjected to a force in an orientation of the axis perpendicular to the ground.

23. A method according to claim 13 wherein the track is flexibly mounted on the base for allowing thermal expansion or contraction thereof.

24. A method according to claim 13 wherein the concentrator support structure is designed to track the sun at an accuracy of substantially at least a few milliradian.

* * * * *